Jan. 7, 1936.  H. D. RICE  2,027,322
PRINTER'S BLANKET
Filed June 21, 1933
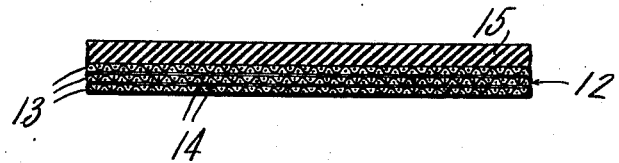
Inventor
Harold deBlois Rice
By Walter L. Pipes
Attorney Patented Jan. 7, 1936

2,027,322

UNITED STATES PATENT OFFICE 2,027,322

PRINTER'S BLANKET

Harold D. Rice, Barrington, R. I., assignor, by mesne assignments, to United States Rubber Company, New York, N. Y., a corporation of New Jersey Application June 21, 1933, Serial No. 676,854

9 Claims. (Cl. 154—54.5)

This invention relates to printer's blankets, and more particularly to printer's blankets having a textile fabric or other fibrous base having a vulcanized rubber coating thereon.

The printer's blanket is an important and essential part in printing machines of many types, being used particularly as an ink-receiving and transferring surface, as in offset printing, and as an impression backing, as in newspaper printing. Vital characteristics demanded in such blankets are uniform thickness; a perfectly smooth, even surface free from pits, irregularities, or imperfections of any kind, so as to give a sharp outline to the print with freedom from smudging; toughness and resilience; resistance to oil absorption; and the ability to withstand repeated distortion by printing type, rolls, or plates, without becoming permanently deformed or embossed.

Printer's blankets are generally provided with a fibrous backing, which may consist of a felt or a woven fabric, and an outer coating of rubber, which may be applied either by a calendering process, or by the spreading of an organic solvent rubber cement. In the manufacture of better grades of blankets, rubber cements are used according to common practice, and a rubber layer of the desired thickness is built up on the fibrous backing by the repeated application of rubber cement and drying of the same. In the cheaper grades of blankets, the rubber may be calendered on to the fibrous backing, and in such cases the rubber compositions generally contain high proportions of filler materials which have been used to reduce oil absorption. Such loading with filler materials, however, results in an undesirable hardness and loss of resilience in the finished blanket. After the rubber coating has been applied to the fibrous backing either by calendering or by cement spreading process, and the desired thickness of rubber has been built up, the rubber coating is vulcanized, and the surface is ground so as to obtain uniform thickness and in order that the rubber surface will hold the ink as applied by the inking rollers.

In the surfacing of printer's blankets made by the calendering process wherein large amounts of filler materials have been used, the grinding of the vulcanized rubber coating to provide a uniform thickness produces a rubber surface containing fine gritty or crystalline material, so that the grinding process usually results in a surface having numerous fine particles embedded in or partly projecting from the surface, or having numerous fine depressions or pits where the gritty matter has been torn out by grinding, thus resulting in the transference of imperfect impressions on printing. In the case of grinding the surface of a rubber layer produced by the cement spreading process, air bubbles in the cement used for the spreading may also cause serious defects in the finished surface.

The resistance to oil absorption, and the ink repellent properties of the rubber surface, are of extreme importance in printer's blankets, and various "dopes" have been suggested for improving the ink repellent properties of the rubber surface. It has also been proposed to provide an outer coating of a relatively hard rubber and an intermediate layer of a relatively soft rubber vulcanized to the fibrous base. Various resin materials have been suggested as substitutes for the usual rubber coating on printer's blankets in order to obtain the desired oil-proof and ink-proof properties necessary for the successful industrial utilization of the blanket.

An object of the present invention is to provide a printer's blanket having a surface characterized by great resilience and by improved resistance to the absorption of oils such as those used in printing inks.

Another object is to provide a blanket having a surface which is free from fine gritty or crystalline particles, and from minute holes or pits.

A further object is to provide a blanket having a cushioning surface of improved toughness and resilience.

Other objects and advantages will appear from the following description.

In the drawing are shown various present preferred embodiments of the invention in which:

Fig. 1 illustrates a printer's blanket according to the present invention having a felt base;

Fig. 2 illustrates another form of printer's blanket according to the present invention having a base of superposed layers of fabric material.

In carrying out the present invention, a fibrous base, such as a base composed of a plurality of superposed layers of fabric material suitably bonded together, or a felt base, is provided with a rubber coating of suitable thickness directly from an aqueous dispersion of rubber such as latex. A series of coatings of latex, preferably containing vulcanizing ingredients, is applied to one surface of the backing until the desired thickness has been obtained, each successive coating being dried before the next coating is applied. When a suitable number of coatings have been applied to the backing, the rubber is vulcanized, preferably by heating at elevated temperatures, as is well known in the art.

If desired a liquid or gaseous coagulant may be applied to the backing, and to each successive coating of latex, prior to, during, or after the drying step, to promote the setting of the coatings and to effect the deposition of a thicker coating in each spreading operation.

The aqueous rubber dispersion may be, for example, a natural rubber latex which may have been modified in any desired manner, such as by concentrating and/or purifying, or by the addition of any desired stabilizers, thickeners, fillers, preservatives, and vulcanizing ingredients. Vulcanized latex may also be employed. The fillers and other additional materials may be incorporated into the latex, by well known methods, in highly dispersed form so that the surface of the layer of rubber deposited therefrom remains free of pits and gritty matter when ground to produce the final surface finish on the blanket.

The addition of filler materials, etc., to the latex in the form of dispersions will provide in the finished rubber surface when ground a freedom from gritty material, the presence of such gritty material being a serious objection to the use of calendered rubber surfaces wherein during the milling and mixing operation prior to the calendering the usual coarse filler materials are added to the rubber compound.

The base material may be felt or superposed layers of fabric material. When a plurality of layers of fabric material are used as the backing, they may be bonded together by any suitable adhesive. For this purpose a rubber cement may be used but it is preferred to use a latex adhesive as well known in the art. When the adhesive used in plying up the fabric backing is a rubber adhesive, such as a cement or a latex adhesive, the adhesive preferably contains vulcanizing ingredients so that on subsequent vulcanization of the rubber coating, to vulcanize the rubber coating and bond it to the backing, the adhesive used in plying up the fabric backing layers will also vulcanize the layers together in a manner well known in the art.

To permit the highest speed and economy in the manufacture of the blankets I prefer to use a concentrated latex of about 60% total solids content such as may readily be obtained by any known method of concentration, as by a chemical creaming, or mechanical creaming such as centrifuging, as is well known in the art. By utilization of a high rubber content latex, such as a 60% latex, the desired thickness of rubber coating for the blanket may be obtained in as few as 20 to 25 spreader coats whereas in usual practice with spreader coats from solvent rubber cements, 80 to 90 spreader coats are necessary for the same thickness. This is obviously so since a spreadable solvent rubber cement is substantially impractical if the rubber content exceeds about 20% whereas latex of concentrations even above 60% may be satisfactorily spread and dried to a smooth even surface.

After the desired thickness of rubber coating has been deposited from the aqueous dispersion on the backing, the material is vulcanized, preferably by heating at an elevated temperature. If an unvulcanized latex containing vulcanizing ingredients has been employed for spreading the rubber coating on the backing, vulcanization at elevated temperatures will form a vulcanized coating and will also vulcanize the coating to the backing material, and if as above described superposed layers of fabric have been bonded by a vulcanizable rubber adhesive, then the layers of fabric will be vulcanized to one another by by means of such adhesive. If a so-called vulcanized latex is used, final heating may produce a complete vulcanization of the coating, since vulcanized latex is not as a rule completely vulcanized in the dispersed form and when rubber deposited from such a latex is subsequently heated at elevated temperatures a further vulcanization takes place. Upon the completion of the drying and/or vulcanizing operations, the layers of rubber deposited from the dispersion will have become united into a single layer of grainless unbroken down rubber integral with the backing. The goods are then ready to be surfaced or ground in the usual manner, in order to condition the rubber surface and to obtain perfect uniformity in the thickness of the blanket. The resulting product after surfacing is a printer's blanket material of uniform thickness and having a surface composed of tough, resilient, grainless unbroken-down rubber and being highly resistant to cutting and permanent deformation by inking and/or printing plates or rolls. It has also been found that resistance to oil absorption of such a surface deposited directly from latex is markedly superior to a rubber surface formed by the usual calendering process in which there is generally a high filler content, or to a rubber surface formed from solvent cement.

In Fig. 1 is illustrated a portion of a printer's blanket with a felt base 10 and a coating 11 thereon vulcanized to the felt base 10, the coating being deposited directly from an aqueous dispersion of rubber. In Fig. 2 is illustrated a portion of a printer's blanket with a backing 12 formed of superposed layers of fabric 13 bonded together by an adhesive material 14 such as rubber latex and a coating 15 superposed upon the backing, the layer 15 being the solids deposit of an aqueous dispersion of rubber and vulcanized to the backing and the fabric layers being vulcanized to each other by means of the adhesive 14.

The blanket material may be made in roll or sheet form, to be cut into sheets of the desired size for covering rolls, and the like, and it may also be made in the form of endless belts to be used as a backing to convey material which is to be printed directly from rolls, as for newspaper printing.

As a further specific example of carrying out the present invention, and without intention to limit the same, the following detailed procedure is included:

A sheet of fibrous backing material of .04 inch thickness was coated with a latex of the following composition:

| | |
|---|---|
| Rubber (as latex of 65.7% solids content) | 100 |
| Formalin | 4.65 |
| Water | 3.0 |
| Potassium hydroxide | 0.20 |
| Crimson antimony | 20 |
| Sulfur | 6.8 |
| Whiting | 75 |
| Red iron oxide | 12 |
| Zinc oxide | 2 |
| Potassium hydroxide | 0.7 |
| Sodium isopropyl-naphthalene sulfonate | 0.6 |
| Glue | 6 |
| Water | 70 |
| Heptaldehyde-aniline condensate | 1.50 |
| Acetone-diphenylamine condensate | 0.75 |
| Solvent naphtha | 1.5 |
| Glue | 0.375 |
| Sodium isopropyl-naphthalene sulfonate | 0.375 |
| Water | 6.75 |

(Total solids, 62.1%)

The spread fibrous material was dried at 90° C. and additional coats were applied to the surface, with similar drying after each spreading operation until 25 coats had been spread, giving an overall thickness of the rubber coating of .03 inch. The blanket was then wrapped on a drum and vulcanized at 135° C. for 150 minutes. The surface was then ground in the usual manner to smooth the surface of the rubber coating.

This blanket was tested for its resistance to oil absorption and compared with the oil absorption of a solvent cement spread blanket, which is the common high-grade blanket, and a calendered rubber surfaced blanket having a high filler content, which is a cheaper present grade of blanket, with results as follows: The oil absorption in the following table is expressed in grams of oil absorbed over an area of 100 sq. cm. after the rubber surface has been in contact with a two-inch head of oil for 20 hrs. at 25° C.

| Type of blanket | Oil absorption |
| --- | --- |
| Made from latex as above | 0.39 |
| Solvent cement-spread (high grade) | 0.66 |
| Calendered rubber—high filler (cheaper grade) | 0.50 |

From the above table it may clearly be seen that the production of a printer's blanket with a coating directly from a rubber dispersion provides a new type of printer's blanket having high resistance to oil absorption. Due to the unbrokendown grainless nature of the rubber coating deposited directly from latex, a rubber surface having the desired resilience and an improved toughness is obtained.

The blanket material of this invention may be employed to provide a tough, resilient, oil-resistant covering for printing rolls, the covering being wrapped around and secured to the roll in known manner. The material is also especially suited for use as impression backing material, such as is used in newspaper printing to support the paper as it travels under the printing rolls. The material may also be adhesively secured in known manner to a sheet metal backing to provide improved engraver's plates.

It is understood that the invention is not limited to the specific embodiments shown in the examples as will be evident to those skilled in the art, and that the invention permits of various modifications without departing from the spirit thereof, and it is my intention not to be limited to the scope of the invention except as required by the state of the art and as set forth in the appended claims.

Having thus described my invention, what I claim and desire to protect by Letters Patent is:

1. A printer's blanket consisting of a base and a coating of the solids deposit of an aqueous dispersion of rubber vulcanized to said base.

2. A printer's blanket comprising a fibrous base and a printing surface on said base of the solids deposit of an aqueous dispersion of rubber, said surface being vulcanized.

3. A printer's blanket comprising a base and a printing surface on said base of the solids deposit of a latex composition, said surface being vulcanized.

4. A printer's blanket consisting of a fibrous base and a coating of the solids deposit of a latex composition vulcanized to said base.

5. A printer's blanket comprising a base containing a plurality of superposed layers of fabric bonded together by adhesive material and a printing surface on said base of the solids deposit of an aqueous dispersion of rubber, said surface being vulcanized.

6. A printer's blanket consisting of a base containing a plurality of superposed layers of fabric bonded together by a vulcanized rubber composition and a coating of the solids deposit of a latex composition vulcanized to said base.

7. A printer's blanket comprising a fibrous base and an outer coating on said base of the solids deposit of an aqueous dispersion of rubber, said coating being vulcanized.

8. A printer's blanket comprising a base and an outer coating on said base of the solids deposit of a latex composition, said coating being vulcanized.

9. A printer's blanket comprising a base containing a plurality of superposed layers of fabric bonded together by adhesive material and an outer coating on said base of the solids deposit of an aqueous dispersion of rubber, said coating being vulcanized.

HAROLD D. RICE.